(12) United States Patent
Lynn

(10) Patent No.: US 8,237,660 B2
(45) Date of Patent: Aug. 7, 2012

(54) DATA INPUT DEVICE

(75) Inventor: Dara Lynn, The Woodlands, TX (US)

(73) Assignee: Dara Lynn, Jacksonville, FL (US)

( * ) Notice: Subject to any disclaimer, the term of this patent is extended or adjusted under 35 U.S.C. 154(b) by 672 days.

(21) Appl. No.: 12/291,472

(22) Filed: Nov. 10, 2008

(65) Prior Publication Data

US 2009/0184927 A1    Jul. 23, 2009

Related U.S. Application Data

(60) Provisional application No. 61/021,789, filed on Jan. 17, 2008.

(51) Int. Cl.
*G06F 3/033* (2006.01)
(52) U.S. Cl. .......................................... 345/168; 345/179
(58) Field of Classification Search ........................ None
See application file for complete search history.

(56) References Cited

U.S. PATENT DOCUMENTS

| | | | |
|---|---|---|---|
| D418,494 S | 1/2000 | Robb | |
| 6,249,277 B1* | 6/2001 | Varveris | 345/179 |
| 6,626,598 B2* | 9/2003 | Schneider | 401/8 |
| D487,896 S | 3/2004 | Tanner, Jr. | |
| D544,484 S | 6/2007 | Hussaini et al. | |
| 2005/0057493 A1 | 3/2005 | Chun | |
| 2006/0221066 A1* | 10/2006 | Cascella | 345/179 |
| 2008/0060107 A1 | 3/2008 | Capson | |

* cited by examiner

*Primary Examiner* — Muhammad N Edun
(74) *Attorney, Agent, or Firm* — James Ray & Assoc

(57) ABSTRACT

A data input device for use with at least one of a touch screen, a keyboard, and a combination thereof is provided. Such data input device includes a stylus member engageable at a first end thereof with at least one of such touch screen, such keyboard, and such combination thereof. Such stylus member is manufactured from a first predetermined material and has a first predetermined size and a first predetermined shape. A securing mechanism is at least one of disposed on such stylus member and formed integrally with such stylus member for securing such stylus member to at least one of a user's finger, a user's thumb, and a combination thereof.

18 Claims, 3 Drawing Sheets

DATA INPUT DEVICE

CROSS REFERENCE TO RELATED APPLICATION

This patent application is related to and claims priority from U.S. Provisional Patent Application Ser. No. 61/021,789 filed Jan. 17, 2008.

FIELD OF THE INVENTION

The present invention relates, in general, to stylus devices and, more particularly, this invention relates to a thumb mounted input device and a finger mounted input device for use with handheld portable electronic devices and other devices having keyboards, number pads, alphabet pads, punch button pads, and the like.

BACKGROUND OF THE INVENTION

Prior to the conception and development of the present invention, stylus devices, as are generally well known in the prior art, have been formed in the shape of pencils and are used with touch screens and the like to input information.

Specifically of interest to the present invention are the following: Schneider, U.S. Pat. No. 6,626,598, discloses an adjustable finger stylus for operating a touch sensitive screen and for entering data in a personal data assistant (PDA). Once sized, the stylus can be slipped on and off the user's finger as needed.

Varveris, U.S. Pat. No. 6,249,277, discloses a finger stylus for a touch screen including a flexible non-metallic elastic ring or a flexible, fabric-like strap having distal ends, each of the distal ends includes parts of an interconnect fastener such as a hooks and loops or a magnetic fastener. The ring wraps around a human fingertip and includes an intermediate portion including a loophole extending from an exterior surface of the intermediate portion which receives a longitudinal stylus rod extending through the loophole in a semi-friction-fit connection with the loophole. The rod extends through the loophole and above and beyond a user's fingertip for touching a touch screen.

Hussaini, et al, U.S. Design Pat. No. D544,484 discloses the ornamental design for a finger tip stylus.

Tanner, U.S. Design Pat. No. D487,896, discloses the ornamental design for a finger tip stylus for small keyboard and touch screen data input.

Robb, U.S. Pat. No. D418,494, discloses the ornamental design for a finger tip stylus.

Chun, et al, U.S. Publication No. 2005/0057493 discloses a thumb stylus with partially wraps around a user's thumb, such thumb stylus being constructed of a single piece of injection molded plastic, flexible, with a tapered tip.

SUMMARY OF THE INVENTION

The present invention provides a data input device for use with at least one of a touch screen, a keyboard, and a combination thereof. Such data input device includes a stylus member engageable at a first end thereof with at least one of such touch screen, such keyboard, and such combination thereof. Such stylus member is manufactured from a first predetermined material and has a first predetermined size and a first predetermined shape. A securing mechanism is at least one of disposed on such stylus member and formed integrally with such stylus member for securing such stylus member to at least one of a user's finger, a user's thumb, and a combination thereof.

According to another embodiment, a data input device for use with at least one of a touch screen, a keyboard, and a combination thereof is provided. Such data input device includes a ring for placement at least one of on a predetermined digit, around a predetermined portion of a predetermined digit, and a combination thereon, such ring being manufactured from a first predetermined material and having a first predetermined size and a first predetermined shape. An input member is at least one of disposed on and formed integrally with such ring. Such input member is manufactured from a second predetermined material and has a second predetermined shape and a second predetermined size. Such input member is for at least one of striking at least one predetermined key of such keyboard, touching at least one predetermined portion of such touch screen, and a combination thereof.

OBJECTS OF THE INVENTION

It is, therefore, one of the primary objects of the present invention to provide an input device for enabling a user to quickly, easily, and efficiently input information into an electronic device such as a cell phone, a portable digital assistant, a computer, a laptop, and text messaging device, and the like.

Another object of the present invention is to provide a stylus device which can be releasably attached to a finger or the end of a user's thumb such that the stylus may then be used to enter information into an electronic device.

Still another object of the present invention is to provide a ring type device which includes a stylus tip disposed thereon such that the ring type device can encircle a user's digit and the stylus tip used to apply pressure to keys and touch screen thereby inputting information.

Yet another object of the present invention is to provide an inexpensive device which can enable person's with large fingers to easily input information into electronic devices, especially portable handheld electronic devices.

In addition to the various objects and advantages of the present invention described with some degree of specificity above it should be obvious that additional objects and advantages of the present invention will become more readily apparent to those persons who are skilled in the relevant art from the following more detailed description of the invention, particularly, when such description is taken in conjunction with the attached drawing figures and with the appended claims.

Figure 1:
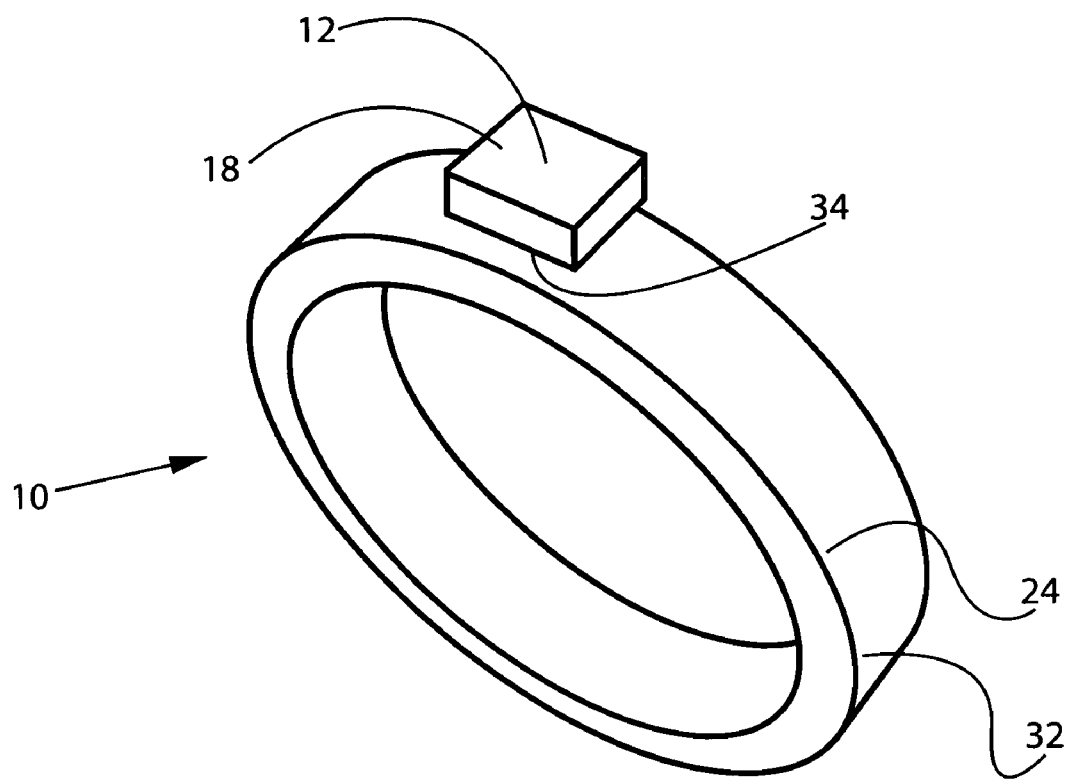
FIG. 1 is a partial perspective view of the invention according to one embodiment of the invention.

BRIEF DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures.

Reference is now made, more particularly, to FIGS. 1-6.

A data input device, generally designated 10, for use with at least one of a touch screen 13, a keyboard 14, and a combination thereof is provided. Such data input device 10 includes a stylus member 12 engageable at a first end 18 thereof with at least one of such touch screen 13, such keyboard 14, and such combination thereof. The term keyboard is meant to include keyboards, keypads, typing pads, number pads, input pads, and any type of alphabet and numeric input pads such as those found on personal digital assistants, cell phones, telephones, computer keyboards, text messaging devices, handheld electronics, and the like. Such stylus member 12 is manufactured from a first predetermined material and has a first predetermined size and a first predetermined shape. It is presently preferred that such first predetermined end 18 of such stylus member 12 includes a rounded tip 22, and that both stylus member 12 and rounded tip 22 extend radially outward from the exterior peripheral surface of the ring member 32. Furthermore, the stylus member 12 is being sized smaller than the width of the ring member 32.

A securing means 24 is at least one of disposed on such stylus member 12 and formed integrally with such stylus member 12 for securing such stylus member 12 to at least one of a user's finger 26, a user's thumb 28, and a combination thereof.

It is presently preferred that such securing means 24 is a ring member 32 operably connected to such stylus member 12 at a second predetermined end 34 of such stylus member 12, such ring member 32 being manufactured from a second predetermined material and having a second predetermined size and a second predetermined shape.

It is presently preferred that such first predetermined material is at least one of rubber, plastic, metal, and a combination thereof. It is presently most preferred that such first predetermined material is rubber.

It is presently preferred that such second predetermined material is at least one of an elastomer, plastic, metal, and a combination thereof. It is presently most preferred that such second predetermined material is metal.

According to one embodiment such second predetermined material is an elastomer and such elastomer is rubber.

According to another embodiment, such first predetermined material and such second predetermined material are substantially identical.

According to still another embodiment, such stylus member and such ring member are integrally formed.

Figure 4:
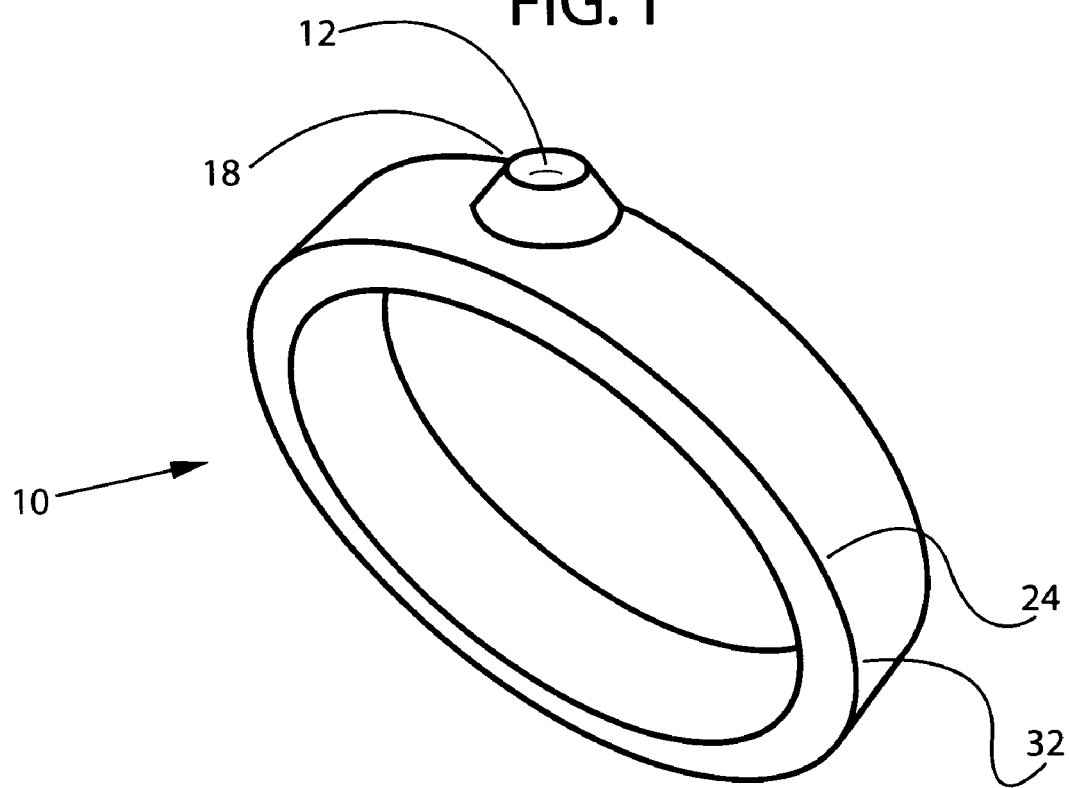
FIG. 4 is a partial perspective view of the invention according to one embodiment of the invention.

According to another embodiment, such first predetermined end of such stylus member is generally frusto conical as illustrated in FIG. 4.

Figure 6:
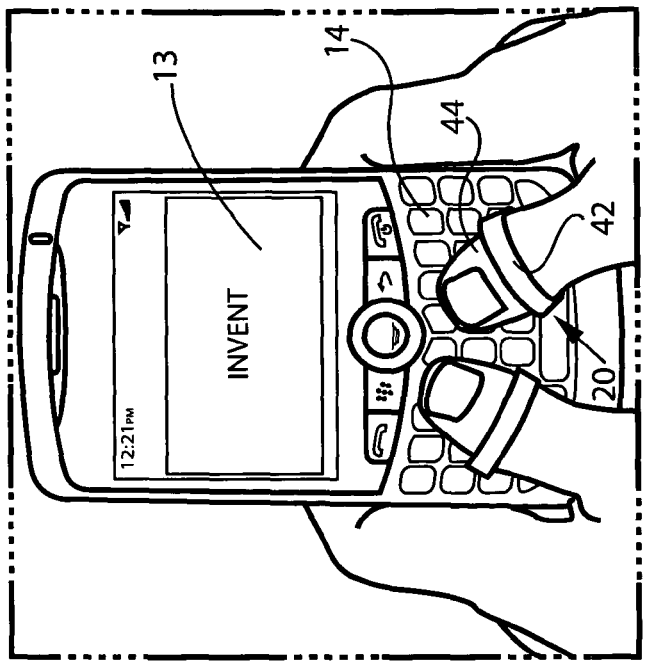
FIG. 6 is a partial perspective view of the invention according to one embodiment of the invention.
Figure 5:
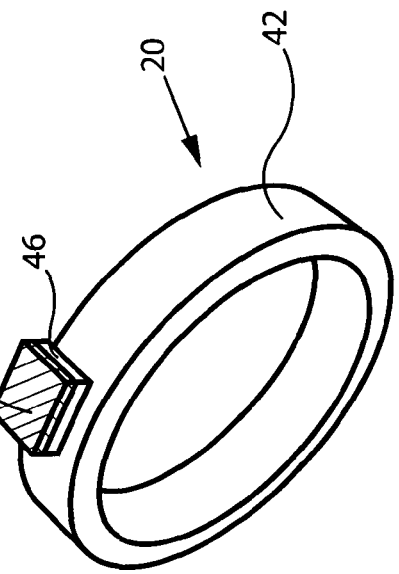
FIG. 5 is a partial perspective view of the invention according to one embodiment of the invention.
Figure 2:
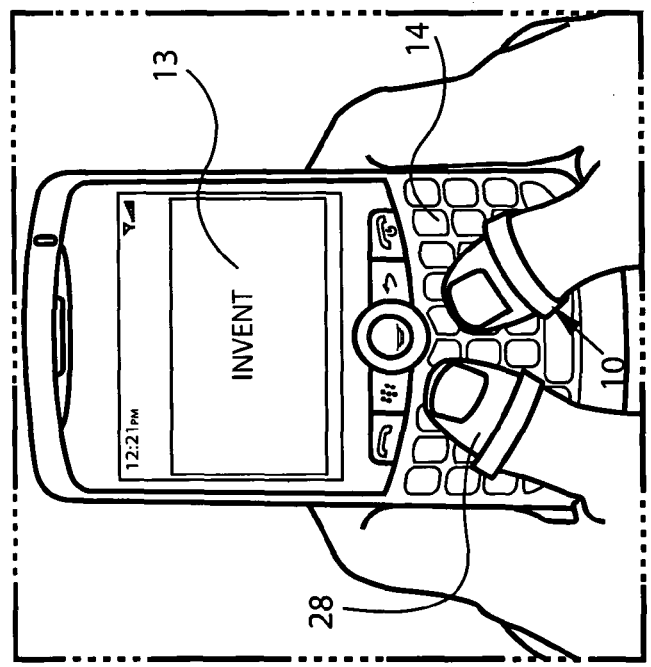
FIG. 2 is a partial perspective view of the invention according to one embodiment of the invention in which the device has been place on a thumb of a user such that such user may input information into a handheld electronic device.
Figure 3:
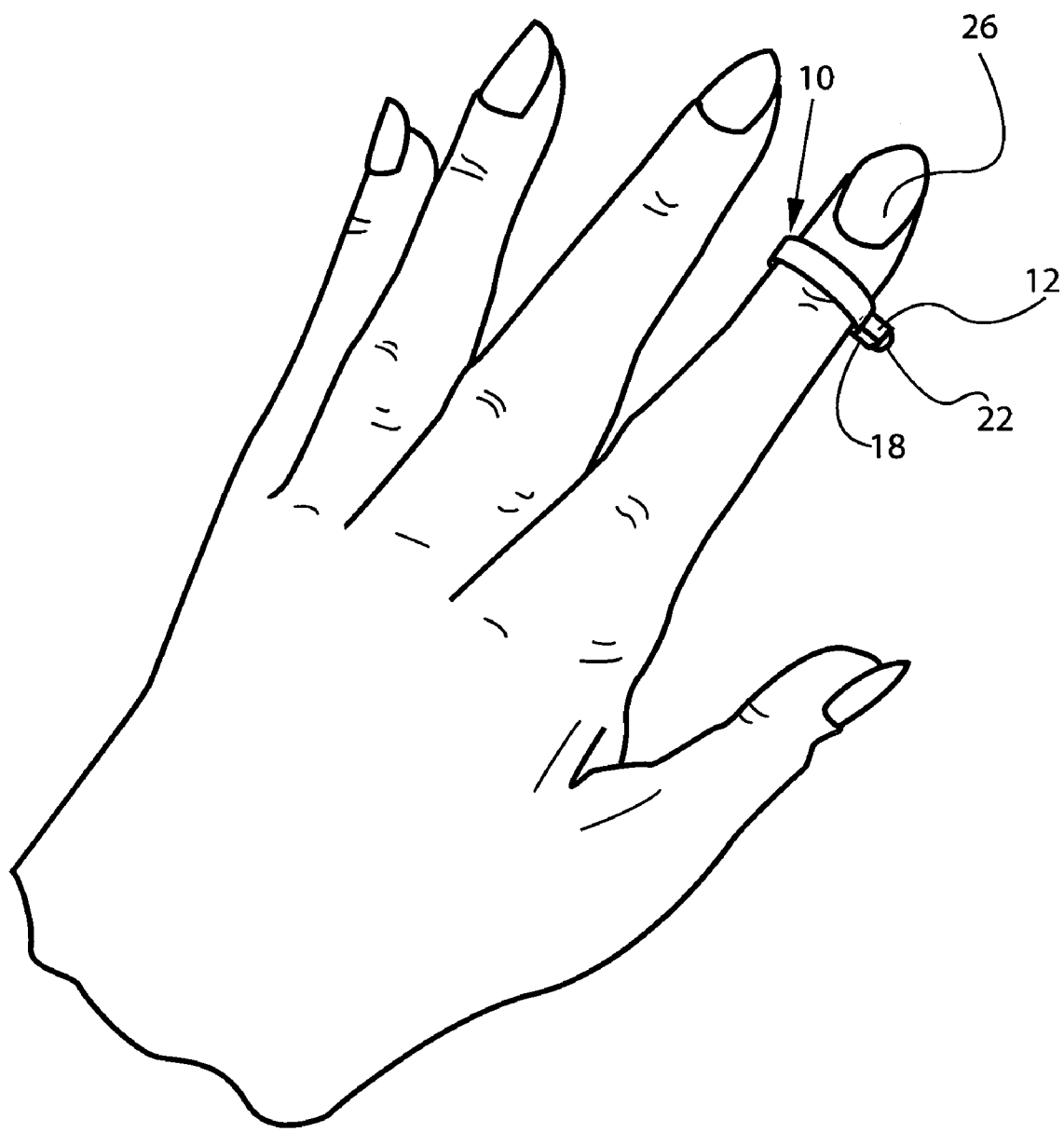
FIG. 3 is a partial perspective view of the invention according to one embodiment of the invention in which the device has been placed on a finger of a user.

According to yet another embodiment, referencing FIGS. 5-6, a data input device, generally designated 20 for use with at least one of a touch screen 13, a keyboard 14, and a combination thereof is provided.

Such data input device 20 includes a ring 42 for placement at least one of on a predetermined digit 44, around a predetermined portion of a predetermined digit 44, and a combination thereon, such ring 42 being manufactured from a first predetermined material and having a first predetermined size and a first predetermined shape.

An input member 46 is at least one of disposed on and formed integrally with such ring 42. Such input member 46 is manufactured from a second predetermined material and has a second predetermined shape and a second predetermined size. Such input member 42 is for at least one of striking at least one predetermined key of such keyboard 14, touching at least one predetermined portion of such touchscreen 13, and a combination thereof.

It is presently preferred that such first predetermined shape is ring-shaped.

It is presently preferred that such second predetermined shape is at least one of a rectangle, a ball, and a combination thereof. It is presently most preferred that such second predetermined shape is a rectangle and such rectangle is a square.

It is presently preferred that such first predetermined material is at least one of plastic, rubber, metal, and a combination thereof. It is presently most preferred that such first predetermined material is metal.

It is presently preferred that such second predetermined material is at least one of plastic, metal, rubber, and a combination thereof. It is presently most preferred that such second predetermined material is rubber.

According to another embodiment, as illustrated in FIG. 5, such first predetermined material and such second predetermined material are substantially identical and wherein such input member 46 further includes a coating of rubber 48 disposed on a predetermined portion thereof.

While a presently preferred and various alternative embodiments of the present invention have been described in sufficient detail above to enable a person skilled in the relevant art to make and use the same it should be obvious that various other adaptations and modifications can be envisioned by those persons skilled in such art without departing from either the spirit of the invention or the scope of the appended claims.

I claim:

1. A data input device for use with at least one of a touch screen, a keyboard, and a combination thereof, such data input device comprising;
   a. a stylus member engageable at a first end thereof with at least one of such touch screen, such keyboard, and such combination thereof, said stylus member being manufactured from a first predetermined material and having a first predetermined size and a first predetermined shape; and
   b. a securing means at least one of disposed on said stylus member and formed integrally with said stylus member for securing said stylus member to at least one of a user's finger, a user's thumb, and a combination thereof, wherein said stylus member extends radially outward from an exterior peripheral surface of said securing means.

2. A data input device according to claim 1 wherein said first predetermined end of said stylus member includes a rounded tip extending radially outward from said securing means.

3. A data input device according to claim 2 wherein said securing means is a ring member operably connected to said stylus member at a second predetermined end of said stylus member, said ring member being manufactured from a second predetermined material and having a second predetermined size and a second predetermined shape.

4. A data input device according to claim 3 wherein said first predetermined material and said second predetermined material are substantially identical.

5. A data input device according to claim 4 wherein said stylus member and said ring member are integrally formed.

6. A data input device according to claim 3 wherein said second predetermined material is at least one of an elastomer, plastic, metal, and a combination thereof.

7. A data input device according to claim 6 wherein said second predetermined material is metal.

8. A data input device according to claim 1 wherein said first predetermined material is at least one of rubber, plastic, metal, and a combination thereof.

9. A data input device according to claim 1 wherein said first predetermined material is rubber.

10. A data input device according to claim 1 wherein said stylus member has a generally frusto conical shape.

11. A data input device according to claim 1 wherein said first predetermined material is at least one of plastic, rubber, metal, and a combination thereof.

12. A data input device according to claim 11 wherein said first predetermined material is metal.

13. A data input device for use with at least one of a touch screen, a keyboard, and a combination thereof, such data input device comprising:
   a. a ring for placement at least one of on a predetermined digit, around a predetermined portion of a predetermined digit, and a combination thereon, said ring being manufactured from a first predetermined material and having a first predetermined size and a first predetermined shape; and
   b. an input member at least one of disposed on and formed integrally with said ring, said input member being manufactured from a second predetermined material and having a second predetermined shape and a second predetermined size, and said input member extending radially outward from said ring for the purpose of at least one of striking at least one predetermined key of such keyboard, touching at least one predetermined portion of such touch screen, and a combination thereof.

14. A data input device according to claim 13 wherein said second predetermined shape is at least one of a rectangle, a ball, and a combination thereof.

15. A data input device according to claim 14 wherein said second predetermined shape is a rectangle and said rectangle is a square.

16. A data input device according to claim 13 wherein said second predetermined material is at least one of plastic, metal, rubber, and a combination thereof.

17. A data input device according to claim 13 wherein said second predetermined material is rubber.

18. A data input device according to claim 13 wherein said first predetermined material and said second predetermined material are substantially identical and wherein said input member further includes a coating of rubber disposed on a predetermined portion thereof.

\* \* \* \* \*